(12) United States Patent
Ha

(10) Patent No.: US 9,554,114 B2
(45) Date of Patent: Jan. 24, 2017

(54) DEPTH RANGE ADJUSTMENT FOR THREE-DIMENSIONAL IMAGES

(75) Inventor: Hyeong-Seok Victor Ha, Toronto (CA)

(73) Assignee: Broadcom Corporation, Irvine, CA (US)

( * ) Notice: Subject to any disclaimer, the term of this patent is extended or adjusted under 35 U.S.C. 154(b) by 1070 days.

(21) Appl. No.: 13/233,673

(22) Filed: Sep. 15, 2011

(65) Prior Publication Data

US 2013/0071009 A1 Mar. 21, 2013

(51) Int. Cl.
*G06K 9/00* (2006.01)
*H04N 13/00* (2006.01)
*G06T 7/00* (2006.01)

(52) U.S. Cl.
CPC ......... *H04N 13/0022* (2013.01); *G06T 7/0022* (2013.01); *G06T 7/0075* (2013.01); *G06T 2207/10021* (2013.01); *G06T 2207/20021* (2013.01)

(58) Field of Classification Search
None
See application file for complete search history.

(56) References Cited

U.S. PATENT DOCUMENTS

| | | | |
|---|---|---|---|
| 6,980,210 B1* | 12/2005 | Weiglhofer et al. .......... 345/419 |
| 2002/0191841 A1* | 12/2002 | Harman ........................ 382/154 |
| 2005/0190180 A1* | 9/2005 | Jin et al. ....................... 345/419 |
| 2007/0247522 A1* | 10/2007 | Holliman ........... H04N 13/0003 348/46 |
| 2009/0160934 A1* | 6/2009 | Hendrickson ...... H04N 13/0239 348/47 |
| 2010/0220920 A1* | 9/2010 | Barenbrug ............ G06T 7/0065 382/154 |
| 2011/0050864 A1* | 3/2011 | Bond .............................. 348/51 |
| 2011/0080466 A1* | 4/2011 | Kask et al. ..................... 348/43 |
| 2011/0109720 A1* | 5/2011 | Smolic et al. .................. 348/43 |
| 2011/0169818 A1* | 7/2011 | Pan ........................ G06T 7/0022 345/419 |
| 2012/0014590 A1* | 1/2012 | Martinez-Bauza et al. .. 382/154 |
| 2012/0084652 A1* | 4/2012 | Martinez Bauza H04N 13/0007 715/719 |

\* cited by examiner

*Primary Examiner* — Sumati Lefkowitz
*Assistant Examiner* — Ryan P Potts
(74) *Attorney, Agent, or Firm* — Brinks Gilson & Lione

(57) ABSTRACT

A system is provided for generating a three dimensional image. The system may include a processor configured to generate a disparity map from a stereo image, adjust the disparity map to compress or expand a number of depth levels within the disparity map to generate an adjusted disparity map, and render a stereo view of the image based on the adjusted disparity map.

20 Claims, 12 Drawing Sheets

Depth Range Compression

Depth Range Expansion

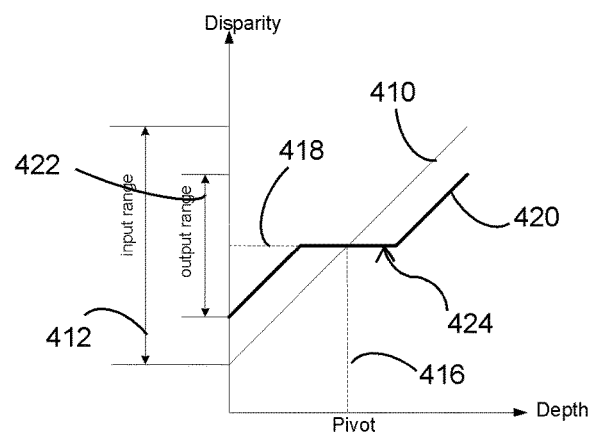 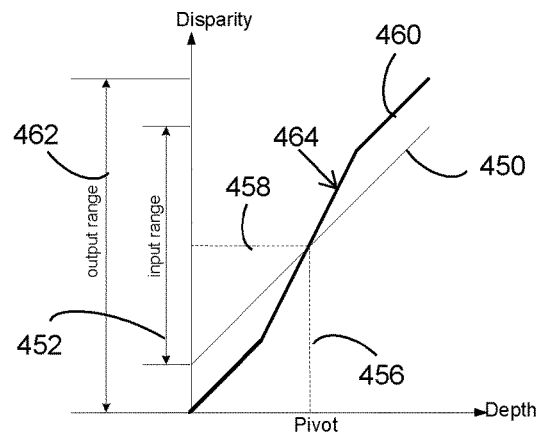
FIG. 4A  FIG. 4B
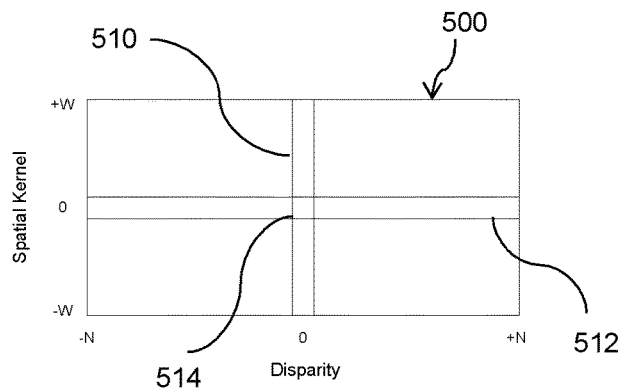
FIG. 5

Small Depth Range Compression in Dual Channel: Large Disparity; Small Magnitude of Δ; Small Error Large Depth Range Compression in Dual-Channel: Small Disparity; Large Magnitude of Δ; Large Error Large Depth Range Compression in Single-Channel: Small Disparity; Small Magnitude of Δ; Small Error

DEPTH RANGE ADJUSTMENT FOR THREE-DIMENSIONAL IMAGES

BACKGROUND

1. Field of the Invention

The present invention generally relates to a system and method for generating three-dimensional images.

2. Description of Related Art

Three dimensional images are being used in various applications including three-dimensional television and three-dimensional gaming. Further, this technology is growing into new areas including various graphical displays for consumer and business applications. One significant attribute of a three-dimensional image is the range of depth and how the depth range is utilized for various applications.

BRIEF DESCRIPTION OF THE DRAWINGS

The system may be better understood with reference to the following drawings and description. In the figures, like reference numerals designate corresponding parts throughout the different views.

FIG. 4A is a graph illustrating depth range compression by shifting;

FIG. 4B is a graph illustrating depth range expansion by shifting;

FIG. 5 is an illustration of a process using a two dimensional array for determining disparity;

DETAILED DESCRIPTION

This application describes a depth range control technique for stereoscopic three-dimensional television (TV). In a typical system, the depth range control process takes three steps: disparity estimation, disparity adjustment, and stereo view rendering. In this application, a set of novel techniques is described for estimating high-quality disparity maps in an efficient manner.

Disparity, also referred to as parallax when the images are measured at the screen, refers to the distance between a corresponding pair of pixels in the left-view and right-view images. The term disparity is used in a general sense throughout this application and includes parallax. It is often measured as a number of pixels. However, it can also be measured directly from the screen in millimeters or centimeters. Positive values of disparity represent points that are behind the screen. Negative values of disparity represent points that are in front of the screen. A disparity value of zero represents the location of the pivot point, which is typically on the display screen.

In one aspect of the system, depth control may be accomplished by shifting instead of scaling: Depth control, both compression and expansion, may happen symmetrically around the pivot point. Therefore, determining the binary relationship, where a given stereo pixel pair is in front of the screen or behind the screen, may be sufficient for disparity estimation. The entire pixel pairs behind the screen can be moved or shifted together in the same direction (either toward the pivot or away from the pivot) and the entire pixel pairs in front of the screen can be moved or shifted together in the same direction. This can be the basis for a disparity shift technique. By shifting in the same direction by the same amount, the inter-relationship of disparity among the pixel pairs on the same side (either in front or behind the screen) are maintained. As such, the method may be much more robust to error.

Figure 1:
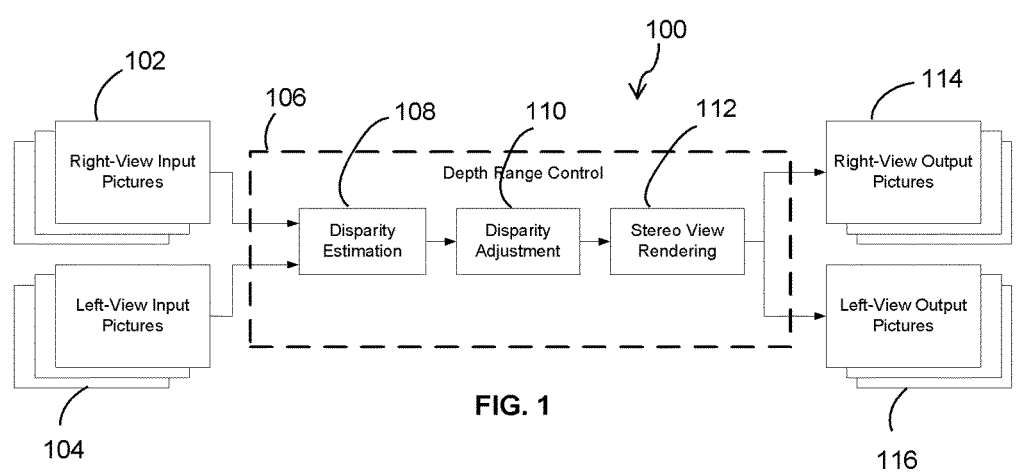
FIG. 1 is a block diagram illustrating one system for depth range control.

Now referring to FIG. 1, a system 100 is provided for depth range control. The system 100 may be implemented on a processor. The system 100 may include a depth range control module 106. The depth range control module 106 may receive a right view input picture 102 and a left view input picture 104. The right view input picture 102 and the left view input picture 104 may be provided to a disparity estimation module 108 within the depth range control module 106. The disparity estimation module 108 may generate a disparity map that is provided to the disparity adjustment module 110. The disparity adjustment module 110 may modify the disparity map to change the distance of a pixel in the right view picture relative to the same pixel in the left view picture. The modified disparity map may be provided to a stereo view rendering module 112. The stereo view rendering module 112 may generate a stereo image including a right view output picture 114 and a left view output picture 116.

Depth range control may be used to control either a depth range compression or depth range expansion. For either case, a reference point (or a pivot point) is identified within the existing volume of the three-dimensional scene. The pivot point must lie between the maximum (most positive) and minimum (most negative) disparity values of the scene. Often times the pivot point is at the screen depth. In depth range compression, all pixels are moved toward the pivot point such that the depth range between maximum and minimum disparity values is reduced. In depth range expansion, all pixels are moved away from the pivot point such that the depth range between maximum and minimum disparity values is increased. The pivot point can be defined as the zero parallax plane by default. The pivot point is a predefined depth level, usually the screen, that serves as the primary depth around which the video occurs.

Figures 2A, 2B:
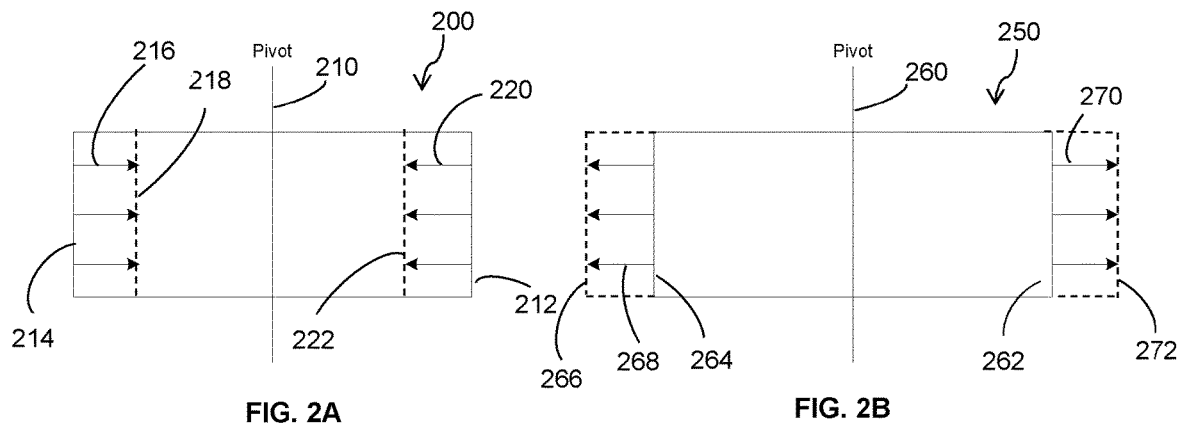
FIG. 2A is an illustration of depth range compression.
FIG. 2B is an illustration of depth range expansion.

Now referring to FIG. 2A, a three-dimensional image 200 is shown undergoing depth range compression. The screen position is illustrated by line 210. The maximum depth value behind the screen is illustrated by line 212, while the minimum (or most negative) depth value in front of the screen is illustrated by line 214. In depth range compression, the maximum depth range behind the screen 212 and/or the minimum or most negative depth range in front of the screen 214 are moved towards the pivot 210, thereby, compressing the overall range of depth values. Accordingly, the depth values behind the screen are shifted towards the pivot, as denoted by arrows 220, shifting the maximum depth level behind the screen to line 222. Similarly, the depth levels in front of the screen may be shifted towards the pivot, as denoted by arrows 216, such that the minimum (or most negative) depth value may be decreased from line 214 to line 218.

Depth range expansion is illustrated in FIG. 2B. An image that is experiencing depth range expansion is denoted by arrow 250. The pivot of the image 250 is denoted by line 260. Line 262 indicates the maximum depth value behind the pivot, while the line 264 indicates the maximum depth value in front of the pivot 260. In depth range expansion, the maximum depth value is moved away from the pivot 260. For example, the depth value 264 may be shifted away from the pivot 260, as denoted by arrows 268, to line 266 indicating the expanded maximum depth value. Similarly, the depth value at line 262, may be shifted as denoted by arrows 270, to the new maximum depth value 272 behind the pivot 260.

One technique for depth range expansion or compression includes disparity adjustment by shifting pixels. Typically when the depth range is compressed or expanded, a scaling factor a is utilized as shown in the equation below:

$$Z'=aZ+b \quad (1)$$

where Z is the input depth value, Z' is the output depth value, a is the scaling factor used for depth control, and b is the shift factor used for convergence control.

For example, a depth range adjustment by a factor of two would require all disparity values to be multiplied by two for depth range expansion or divided by two for depth range compression. This method requires every single disparity value to be estimated accurately in the entire picture and involves multiplication or division operations be applied to every single disparity value.

In this application, a technique is proposed in which all pixels are moved toward or away from the pivot point by the same amount except for those pixels that are located very close to the pivot point. Given a fixed value $\Delta$, all pixels at least a predetermined distance from the zero parallax line are shifted toward the pivot point by $\Delta$ pixels in depth range compression and away from the pivot point by $\Delta$ pixels in depth range expansion.

Figure 3A:
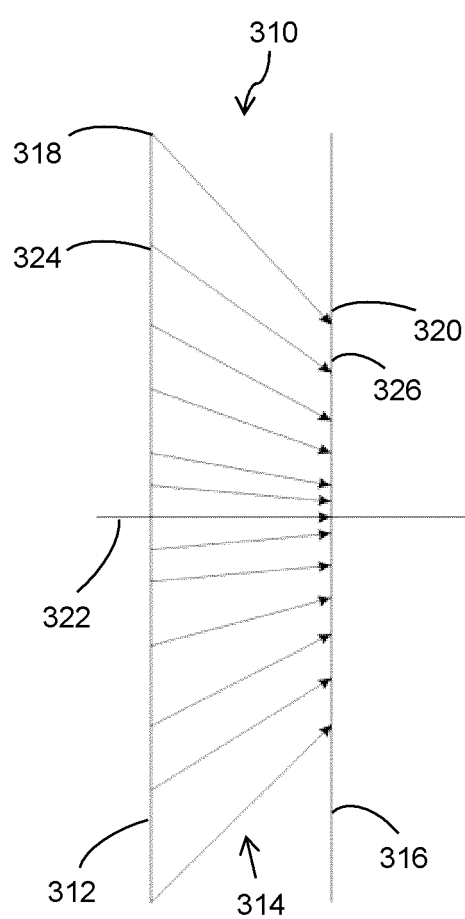
FIG. 3A is an illustration of depth range compression using scaling.

Now referring to FIG. 3A, an illustration of depth range compression based on depth scaling is provided. The image 310 is compressed from depth value 312 to depth value 316, as denoted by lines 314. In this scaling scenario, the disparity values are divided by a compression factor. As such, pixel 318 at depth value 312 is divided by the compression scaling factor to result in a disparity value corresponding to pixel 320. Further, pixel 324 is divided by the compression factor to result in a disparity value corresponding to pixel 326, as such the change in disparity is different from 318 to 320 than from 324 to 326.

Figure 3B:
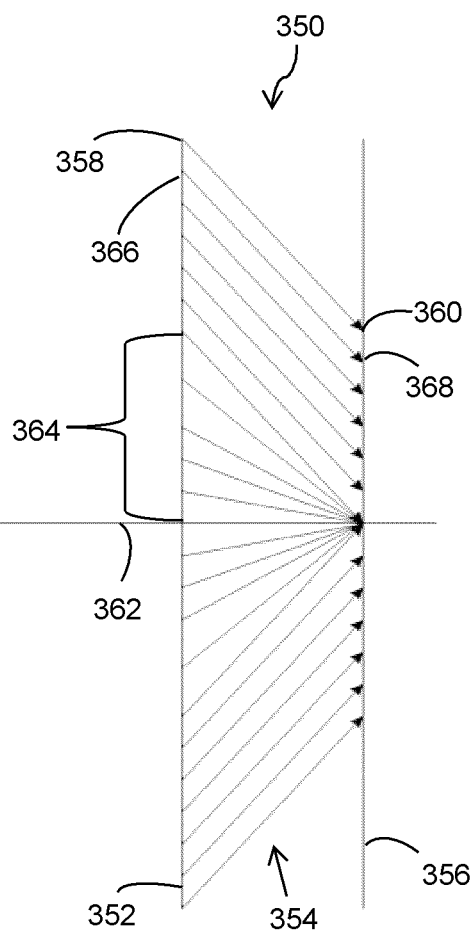
FIG. 3B is an illustration of depth range compression by shifting.

Depth compression by shifting may be better understood with respect to FIG. 3B. Image 350 is denoted at an original depth value 352, where the depth values are compressed to depth value 356, as denoted by lines 354. In this instance, the lines 354 are shifted by a uniform value. Accordingly, in one example, the pixel at disparity value 358 is shifted to disparity value 360. Similarly, the pixel at disparity value 366 is shifted by the same amount to disparity value 368. Any of the pixels within the fixed distance 364 from line 362 are set to zero and transformed to the location of line 362.

This technique allows a binary decision to be made for the disparity of each pixel pair. The pixel pair is determined to be located either in front of the pivot point (e.g., the disparity value is smaller than the disparity at the pivot point) or behind the pivot point. As such, an accurate disparity value for every single pixel pair is not required. This relaxes the computational requirement and also allows the algorithm to be more robust to error. Further, this technique involves only addition and subtraction operations as opposed to multiplications and divisions.

For those pixel pairs located in front of the pivot point, the disparity values are increased by $\Delta$ pixels to move them toward the pivot point. For those pixel pairs located behind the pivot point, the disparity values are decreased by $\Delta$ pixels to move them toward the pivot point. Any pixel pairs closer to the pivot point than $\Delta$ are moved to the pivot point.

Now referring to FIG. 4A, one profile for depth range compression is provided based on adjustment by pixel shifting. In this scenario, the original disparity to depth profile is represented by line 410. The adjusted depth to disparity profile is denoted by line 420. The input range of line 410 is denoted by line 412, while the output range of the adjusted profile 420 is denoted by line 422. Line 418 is the zero parallax line, while line 416 is the pivot. In this scenario, the depth to disparity slope is maintained between the original profile 410 and the adjusted profiled 420, except within region 424 where all the disparity values are set to zero along line 418.

The same concept may be applied to depth range expansion. For those pixel pairs located in front of the pivot point, the disparity values are decreased by $\Delta$ pixels, thereby moving those pixels away from the pivot point. For those pixel pairs located behind the pivot point, the disparity values are increased by $\Delta$ pixels to move those pixels away from the pivot point. Any pixel pairs closer to the pivot point than $\Delta$ are moved away from the pivot point by an amount less than $\Delta$. In one example, pixels closer than $\Delta$ to the pivot point are moved by an amount equal to the distance between the current pixel disparity value and the pivot point.

Now referring to FIG. 4B, a depth range expansion profile is provided. The original depth to disparity profile is provided by line 450. The corresponding input range for the original disparity to depth profile is provided by line 452. The output depth to disparity profile is denoted by line 460 and the corresponding output range is denoted by line 462. The zero parallax line is denoted by line 458, while the pivot is denoted by line 456. As such, the adjusted depth range profile maintains the same depth slope as the original depth range profile 450, except that a different slope is applied within region 464.

In another aspect of the system, a disparity search method is provided. The method may provide the "bottom-up" search method where the processor does not start with a predetermined size or shape of homogeneous/uniform region having the same disparity values. This method starts with a similarity measure of the smallest entity, a pixel, and collects the information of these smallest entities and extracts consistent underlying patterns of disparity in a statistical manner. The example provided below with a 2D array containing disparity axis and spatial axis is only an exemplary implementation of this bottom-up search technique. Because the method does not start with a predetermined size or shape of region (square or rectangular regions in block search or phase plane correlation), the method is free from making mistakes of assigning one disparity to multiple objects/regions.

One such technique for depth range compression and expansion includes searching for pixel-to-pixel correspondence in disparity estimation. Typically, motion searches or disparity searches use block-based methods such as block matching, phase-plane correlation, Sum of Absolute Difference (SAD), Sum of Squared Difference (SSD), or other similar techniques. These block-based methods may suffer from many problems, for example, a problem where only one correspondence is computed for blocks that contain more than one object, region or motion. To overcome this fundamental shortcoming, a bottom-up search method is proposed in which pixel-to-pixel correspondence is computed first and, then, the resulting data is analyzed to extract the correspondence information for the region.

For a left-view pixel $X_L$ located at row yy and column xx, a search is performed on the same row yy in the right-view image. Given the search range [−N, +N], the right-view pixels located in columns (xx−N) to (xx+N) are compared to the reference pixel $X_L$ for similarity. When comparing two pixels for similarity, pixel characteristics such as luma, chroma, edge, or other salient features extracted from the input pictures can be used. If the characteristic value for the reference pixel in the left image is within a threshold amount from the current indexed pixel in the right image, then it can be considered similar. The result is a one-dimensional array of size 1-by-(2N+1) that contains binary indications of similarity of the reference pixel with regard to each pixel in the corresponding disparity of the right image. Within the array, the value of 0 indicates non-similarity and the value of 1 indicates similarity. Each characteristic may be evaluated independently or weighted for determining whether the reference pixel is similar or non-similar. Representing similarity in binary format may be advantageous for efficient implementation. The similarity measure can be represented by any number of bits followed by suitable logical operations to determine and use the similarity measures.

| 0 | 0 | 1 | 1 | 1 | .. | 0 | 1 | 0 |

This one-dimensional array is stored and the same process is repeated for all left-view pixels on the same row and within a horizontal distance w away from the reference pixel $X_L$. The result of this search process is a (2W+1)-by-(2N+1) array of binary data.

Now referring to FIG. 5, a two dimensional matrix is provided with a spatial kernel along the first axis such that each row is the one dimensional array of similarity values and the second axis represents a disparity value for the reference pixel. A matrix 500 includes a column 510 and a row 512 that intersect at the cell location 514 representing similarity the reference pixel to a corresponding pixel in other view at a disparity value of zero.

This two-dimensional array is examined to compute the disparity value of the left-view point $X_L$. For each disparity value (that is, for each column in the two-dimensional array), the length of the longest consecutive string of 1's is counted as long is the value is 1 at column xx. The disparity value that contains this longest string of 1's is the final result if there is one unique string with the largest length. In the example shown below, the longest string of 1's occurs at disparity=−1.

Figure 6:
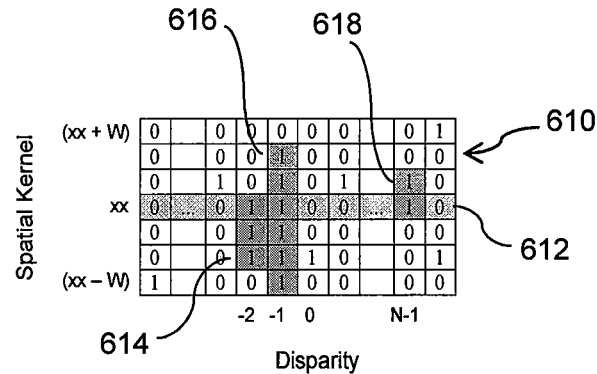
FIG. 6 is an illustration of a process using a two dimensional array for determining disparity using a binary representation of similarity.

Accordingly, a spacial kernel disparity matrix 610 is provided in FIG. 6. Row 612 indicates the one dimensional array of similarity values for the reference pixel position. The rows above and below row 612 are the one dimensional arrays for the pixel locations on either side of the reference pixel location within the current row of the left view image. The processor identifies the column with the longest string of positive values that match. For example, column 618 has two consecutive matching values, while column 614 has a string of three consecutive matching values. The highest number of consecutive matching values is found in column 616 at disparity location negative one. As such, the processor may determine that the correct disparity location for that pixel is a disparity value of −1.

When there is more than one string with the largest length, then other information may be used to break the tie as necessary. In this disclosure, a technique is described that does not require one unique disparity value to be assigned to every pixel pairs in the stereo input and, therefore, breaking the tie may not necessary.

Yet another technique is provided for smooth disparity map generation using a synthetic depth surface. No matter how advanced a given technique is, there are always cases that will be problematic for motion estimation or disparity estimation. For example, images containing flat regions with no texture, repeated patterns, strong noise, and uneven light reflection, may provide certain challenges.

In disparity estimation, it may be beneficial to assign a disparity value to each and every pixel location, yet the resulting stereo pictures should still look natural and convincing. Accordingly, another technique is proposed that provides a smooth continuous disparity map at all times. Moreover, the accuracy of the disparity map is fully scalable depending on the accuracy of the disparity values extracted from the input pictures.

According to this aspect of the system, a method may be provided for using monocular depth cues and depth maps generated from these depth cues to aid disparity estimation process. This may work both ways—disparity estimation results can aid generation of depth maps together with monocular depth cues or depth map results can aid generation of disparity maps. In some implementations of this technique the quality of the disparity estimation results (disparity map) is highly scalable. When the disparity estimation results are good, less of depth map information may be used. When the disparity estimation results are bad, more of depth map information may be used. This technique is also applicable to graceful fallback mode when the disparity estimation performance falls below an acceptable level.

In some implementations, this technique may include three steps. First, a corresponding depth map is extracted from each two-dimensional input image of the stereo input pair. Monocular depth cues are used to extract depth information from each input image. Then, based on the depth cues, a smooth depth surface is created. The smooth depth surface may be referred to as a synthetic depth surface.

Second, disparity is estimated from the stereo input pair using the pixel-to-pixel correspondence, for example using any of the techniques described above (or any other estimator). Only highly confident accurate results are maintained. Alternate other methods can be used to generate the disparity map, however, in the implementation described, only highly confident accurate results are kept. The disparity map extracted in this step may be referred to as a raw disparity map. The raw disparity map can be very sparse or very dense depending on the content of the input picture and the performance of the disparity estimator.

Finally, a final disparity map may be created by combining the synthetic depth surface and the raw disparity map. The smooth synthetic depth surface in the first step may be modified such that all of accurate disparity information in the raw disparity map is reflected in the resulting final disparity map. When the raw disparity map is dense, this step is more like smooth interpolation of the dense raw disparity map and the resulting final disparity map is closest to the ground-truth disparity map. When the raw disparity map is sparse, this step allows a smooth disparity map to be created using the synthetic depth surface without causing visual distractions and artifacts in the output pictures. This step includes the variation of the technique in which the raw disparity map is computed first, and then this information is fed to the synthetic depth map generation step. In this case, the order of the first and the second step may be swapped.

This technique provides a novel method of generating a fallback mode to the depth control system. When disparity estimation results are not reliable, the system still produces output pictures. Instead of passing through the input pictures directly to output, this technique allows a creation of three-dimensional stereo output pictures that look reasonably close to the input pictures at a modified depth range based on synthetic depth maps.

In another aspect of the system, a method may use a LUT and/or piece-wise linear relationship to adjust disparity values in a very flexible manner to meet the preferences and tastes of the users. One feature is to be able to do flexible adjustment of disparities. Another feature may be using k-point LUT for simple and cheap implementation.

Figure 7:
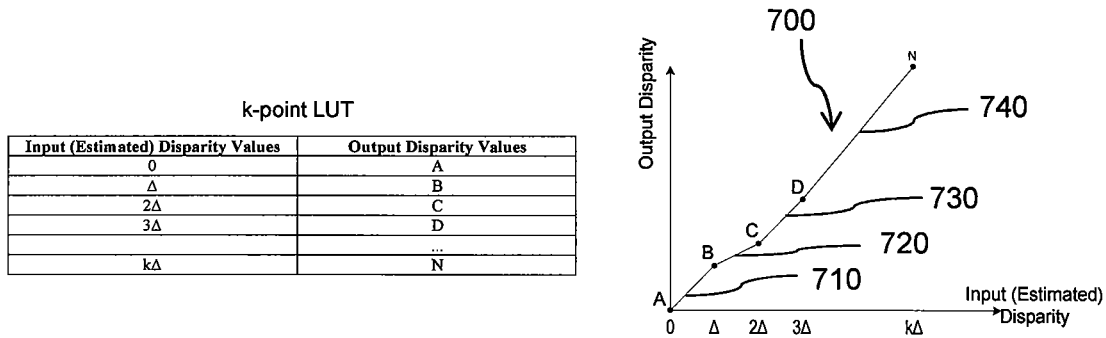
FIG. 7 is an illustration of a multi-segment disparity transform using a k-point LUT.

In some implementations of this technique, disparity may be mapped using multi-segment transforms, for example using a programmable look-up-table (LUT). In this technique, a functional step is added where the disparity values estimated by the disparity estimator block are mapped (or converted) to a different set of disparity values, for example using a programmable LUT. The LUT may contain a finite number of points that define a piece-wise linear curve, as shown in FIG. 7. It is noted that a direct value-to-value LUT may be used or a number of relationships (e.g., functions) may be defined for a plurality of input value ranges.

Now referring to FIG. 7, a plurality of relationships may be defined where each input disparity value range is applied a different relationship to result in an output disparity value. One such profile is illustrated by reference numeral 700. In this illustration, relationship 710 may be applied to pixels with an input disparity value between A and B as denoted by reference numeral 710. Similarly, between input disparity values B and C, a second relationship 720 may be applied. Between point C and D a third relationship 730 may be applied to produce the output disparity value. Further, a fourth relationship is illustrated by line 740 between point D and N, where N represents the maximum input disparity value.

In this scenario, flexible depth control is possible using the piece-wise curve that maps (or translates) the disparity values estimated from the input pictures to a new set of output disparity values. Some examples are shown in the FIG. 8 where only one side of the depth space is modified for depth control. It is possible to decrease or increase the disparity values of the pixels in front of the screen or the pixels behind the screen independently from one another.

Figure 8:
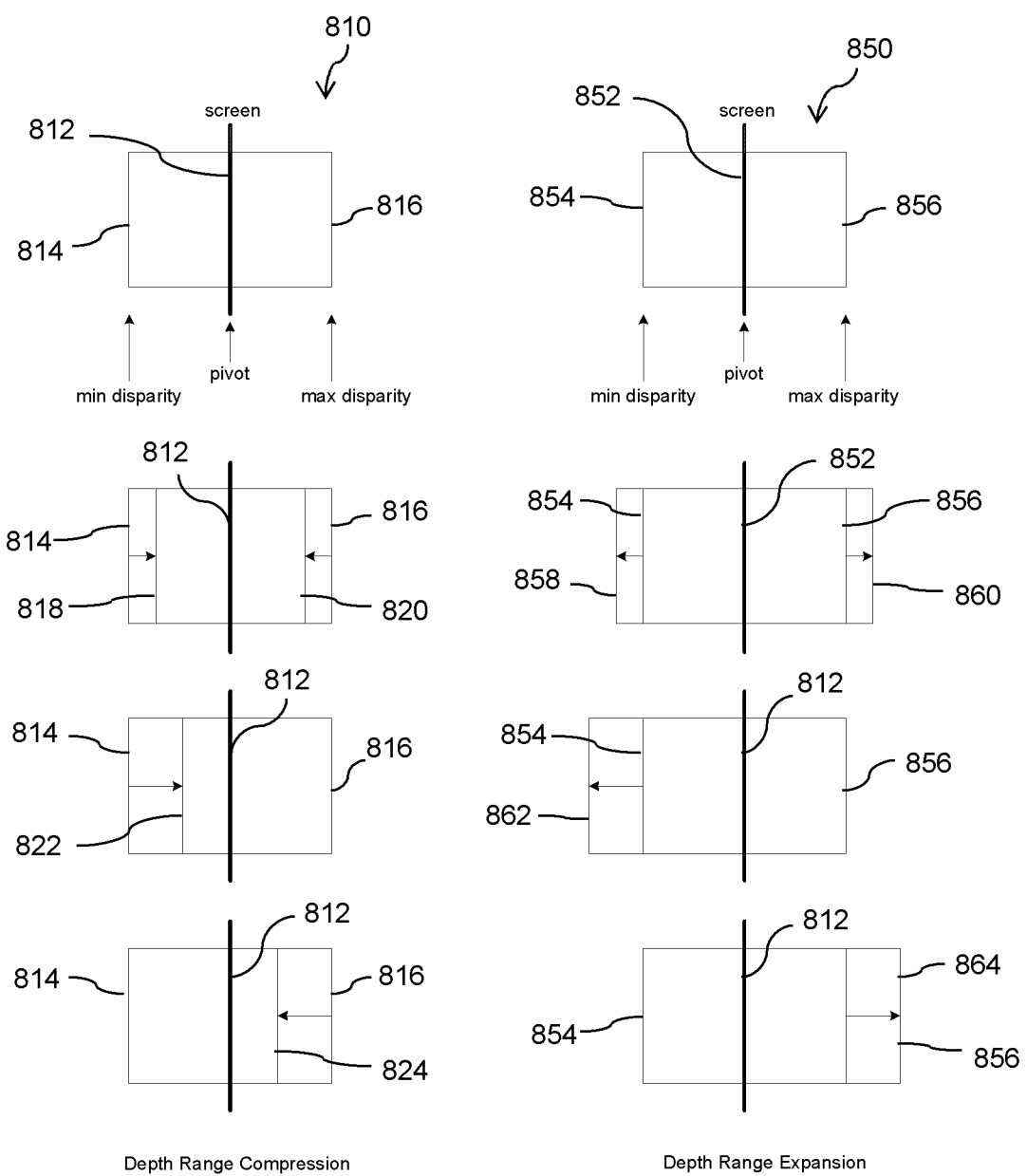
FIG. 8 is an illustration of various non-symmetric depth adjustment.

Now referring to FIG. 8, a series of potential depth range compression algorithms is shown in column 810 while a range of depth range expansion algorithms is shown in column 850. An original image is shown at the top of column 810 with the original minimum disparity value 814 and the maximum disparity value 816. Further, the pivot point is denoted by line 812. In the second image, the processor is configured to compress the minimum disparity value 814 to disparity value 818. At the same time, the maximum disparity value 816 may be compressed to disparity value 820. Further, it should be noted that the amount of change between 814 and 818 and between 816 and 820 may be the same or may be a different change in disparity value depending on the application.

In the third image of column 810, only the minimum disparity value 814 is compressed to disparity value 822. Similarly, in the fourth image of column 810, only the maximum disparity value is compressed from disparity value 816 to disparity value 824. This uneven compression may be helpful for users who may be more or less comfortable with values that appear in front of the screen, while other users may be more or less comfortable with disparity values that appear behind the screen. Accordingly, each user may adjust the parameters or compression factors for both the minimum disparity and maximum disparity separately. As such, a user interface with a control may be provided to set the minimum disparity value and/or the maximum disparity value.

In a similar manner, the original expansion image is provided at the first image in column 850 where the minimum disparity value is denoted by line 854 and the maximum disparity value is denoted by line 856. Further, the pivot line is denoted by line 852. Again, the second image in column 850 denotes expansion of both the minimum disparity value from disparity value 854 to disparity value 858 and the expansion of the maximum disparity value from disparity value 856 to disparity value 860. In addition, the third and fourth images show only expansion of the minimum disparity value from disparity value 854 to disparity value 862 or the minimum disparity value from disparity value 856 to disparity value 864.

The approach using a programmable LUT allows the depth control to be adaptive to scene contents and screen location. Further, it is possible to modify the disparity values only at the far extreme locations in the depth space.

Figure 9A:
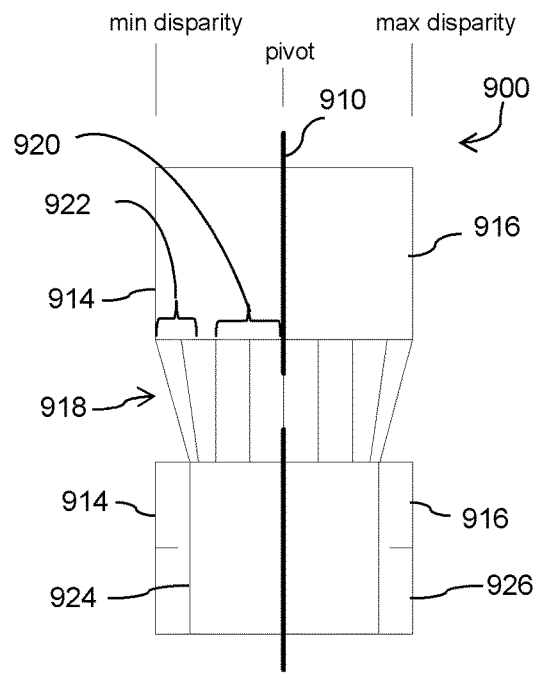
FIGS. 9A-9D are illustrations of various methods for depth compression.
Figure 9B:
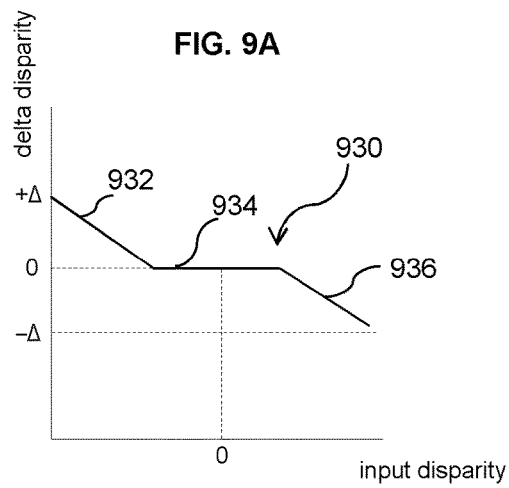

Now referring to FIG. 9A-9D, another example of image compression is provided. In FIG. 9A-9B, the depth control (e.g., depth range compression) is applied only to extreme disparity values closer to maximum and minimum disparity values. The rest of the picture is left unmodified from the original disparity values thus achieving (1) adjustment to improve comfort levels of the viewers and (2) minimizing the amount of visible artifacts or distortion.

For image 900, the maximum disparity value is denoted by line 916 and the minimum disparity value is denoted by line 914, while the pivot is denoted by line 910. In this example, the group of pixels 920 closest to the pivot is not shifted, where the group 922 of pixels beyond a predetermined disparity value is compressed by scaling, as denoted by the lines 918. As such, the minimum disparity value is compressed from disparity value 914 to disparity value 924, while the maximum disparity value is compressed from disparity value 916 to disparity value 926. A profile for this compression is illustrated by line 930. Accordingly, the profile 930 has a sloped relationship indicating the change in disparity from the input disparity, as denoted by region 932 and corresponding to the group of pixels 922. The group of pixels closest to the pivot 920 corresponds to region 934 on the profile 930. The scaled pixels opposite group 922 are denoted by region 936 of the profile 930.

Figure 9C:
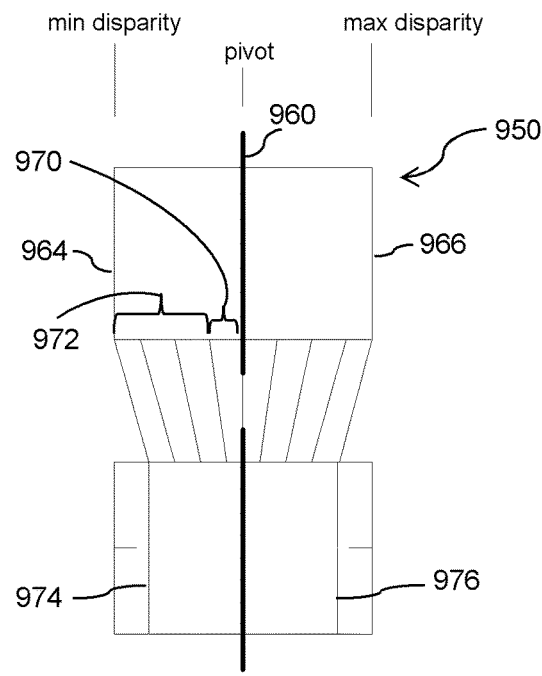
Figure 9D:
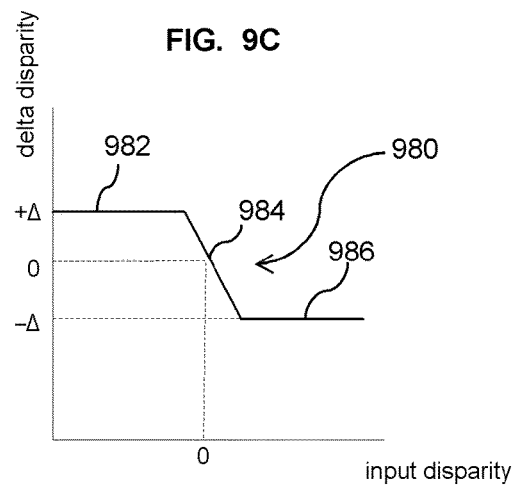

Now referring to FIG. 9C-9D, another example of depth range compression is provided for image 950. In this example, the maximum disparity value is denoted by line 966 and the minimum disparity value is denoted by line 964, while the pivot is denoted by line 960. The group of pixels 970 closest to the pivot are shifted by a reduced amount. As such, the minimum disparity value is compressed from disparity value 964 to disparity value 974, while the maximum disparity value is compressed from disparity value 966 to disparity value denoted by line 976. A profile for this compression is illustrated by line 980.

Accordingly, the profile 980 has a sloped relationship indicating the shift in disparity from the input disparity as denoted by region 982 corresponding to the group of pixels 972. The group of pixels closest to the pivot 970 corresponds to region 984 on the profile 980. The shift in this region is reduced by a scaling factor according to the distance from the pivot to ensure that the pixel is not shifted past the pivot. While the scaled pixels opposite group 972 is denoted by region 986 of the curve 980.

Figure 10:
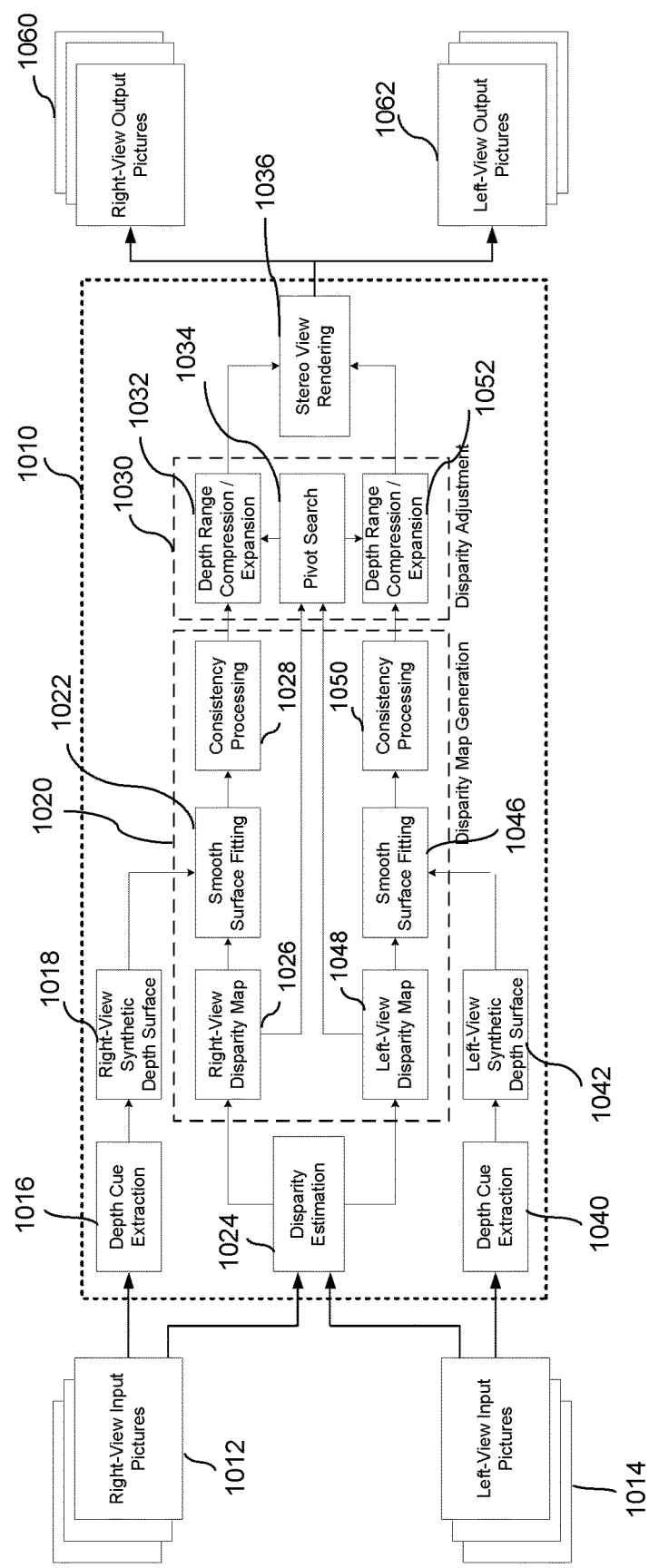
FIG. 10 is a block diagram of a system of a system for depth range control.

Now referring to FIG. 10, a system for depth range control is provided at reference numeral 1010. The system 1010 receives a right view input picture 1012 and a left view input picture 1014. The right view input picture 1012 is provided to a depth queue extraction module 1016 and a disparity estimation module 1024 of the system 1010. The depth queue extraction module 1016 generates a depth map which is provided to a right view synthetic depth surface module 1018. The right view synthetic depth surface module 1018 provides a synthetic surface model to the smooth surface fitting module 1022 of a disparity map generation module 1020.

In addition, the disparity estimation module 1024 receives both the right view input pictures 1012 and the left view input pictures 1014 and generates a right view disparity estimate 1026. The right view disparity estimate 1026 is provided to the surface fitting module 1022. The smooth surface fitting module 1022 provides an adjusted right view disparity map based on the right view disparity estimate 1026 and the synthetic depth surface from the right view synthetic depth surface module 1018. The smooth surface fitting module 1022 may identify regions in the right view disparity estimate with low reliability and replaces the low reliability regions. The low reliability regions may be replaced with the corresponding values for that region in the synthetic surface model or may be combined with the synthetic surface model through a relationship, a weighted average, or other function. The adjusted right view disparity map from the smooth surface fitting module 1022 is provided to the consistency processing module 1028.

The consistency processing module 1029 compares the adjusted right view disparity map with an adjusted left view disparity map to verify consistency. The adjusted right view disparity map is provided to the depth range compression/expansion module 1032 and the disparity adjustment module 1030. The depth range compression/expansion module 1032 also receives pivot information from the pivot search module 1034. The pivot search module 1034 generates pivot information based on the right view disparity estimate 1026 and a left view disparity estimate 1048. As such, the depth range compression/expansion module 1032 provides the compression depth map to the stereo view rendering module 1036.

In a similar manner to the right view processing modules, the left view input pictures 1014 are provided to both the disparity estimation module 1024, as well as, the depth queue extraction module 1040. The depth queue extraction module 1040 provides a depth map to the left view synthetic depth surface module 1042. The left view synthetic depth surface module 1042 provides a depth surface model to the smooth surface fitting module 1046 of the disparity map generation module 1020. Further, the disparity estimation module 1024 generates a left view disparity map estimate 1048. The left view disparity map estimate 1048 is provided to the smooth surface fitting module 1046. As such, the smooth surface fitting module 1046 generates a left view adjusted disparity map that is provided to the consistency processes module 1050, where the left view adjusted disparity map is calculated based on the left view disparity map estimate and the synthetic depth surface.

The consistency processing module 1050 then compares the right view adjusted disparity map to the left view adjusted disparity map. The left view adjusted disparity map is provided to the depth range compression/expansion module 1052. The depth range compression/expansion module 1052 also receives pivot information from the pivot search module 1034 as previously discussed. The depth range compression/expansion module 1052 of the disparity adjustment module 1030 generates an adjusted disparity map to the stereo view rendering module 1036. The stereo view rendering module 1036 then generates a right view output picture 1050 and a left view output picture 1062 based on the left adjusted disparity map and the right adjusted disparity map provided from modules 1032 and 1052, respectively, as well as, the left view input pictures and the right view input pictures.

In another aspect of the system either single or dual channel rendering may be used. As such, the system may use either one input picture (left-view or right-view) or use both input pictures for generating stereo output pictures. When using one input picture, a certain amount depth perception is lost, but more depth compression is possible without visible artifacts.

As such, a novel technique for rendering output stereo pictures using either single or dual-channel of disparity processing is also disclosed. In dual-channel processing, disparity is computed twice. First, disparity from left-view input picture to right-view input picture is computed with the left-view picture as reference. The disparity map created in this step may be denoted 'Left-to-Right Disparity Map' or may be simply referred to as a left disparity map. Next, disparity from right-view input picture to left-view input picture is computed with the right-view picture as reference. The disparity map created in this step may be denoted 'Right-to-Left Disparity Map' or may be simply referred to a right disparity map. When generating the left-view output picture, the left-view input picture and 'Left-to-Right Disparity Map' are used. When generating the right-view output picture, the right-view input picture and 'Right-to-Left Disparity Map' are used.

Figure 11:
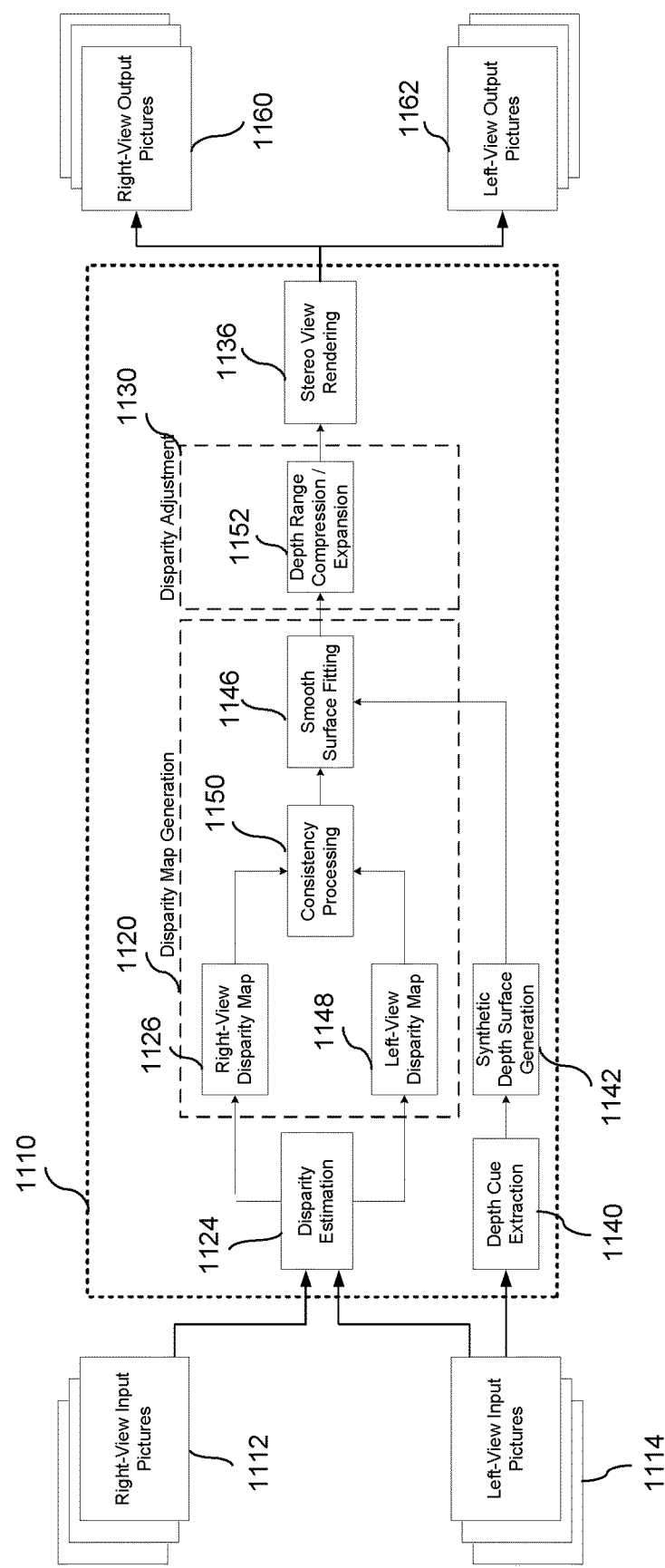
FIG. 11 is a block diagram of a system of another system for depth range control.

Now referring to FIG. 11, another system for depth range control is provided by reference numeral 1110. The system 1110 receives a right view input picture 1112 and a left view input picture 1114. The disparity estimation module 1124 receives both the right view input pictures and the left view input pictures and generates a right view disparity estimate 1126. The right view disparity estimate 1126 is provided to a consistency processing module 1150. The left view input pictures 1114 are provided to both the disparity estimation module 1124, as well as, the depth queue extraction module 1140. The depth queue extraction module 1140 provides a depth map to the left view synthetic depth surface module 1142. The left view synthetic depth surface module 1142 provides a depth surface model to the smooth surface fitting module 1146 of the disparity map generation module 1120.

Further, the disparity estimation module 1124 generates a left view disparity map estimate 1148. The left view disparity map estimate 1148 is provided to the consistency processing module 1150. The consistency processing module 1150 compares the left view disparity map estimate 1148 to the right view disparity map estimate 1126 to check for consistency. The right view disparity map estimate 1126 and the left view disparity map estimate 1148 are provided to the smooth surface fitting module 1146.

The smooth surface fitting module 1146 identifies low reliability regions in the right view disparity estimate and low reliability regions in the left view disparity estimate. The smooth surface fitting module 1146 replaces the low reliability regions, for example, replacing the values of the low reliability regions with corresponding values, as previously described above. An adjusted right view disparity map and an adjusted left view disparity map are provided to the depth range compression/expansion module 1152.

The depth range compression/expansion module 1152 of the disparity adjustment module 1130 provides a right view adjusted disparity map and a left view adjusted disparity map to the stereo view rendering module 1136. The stereo view rendering module 1136 then generates a right view output picture 1160 and a left view output picture 1162 based on the left adjusted disparity map and the right adjusted disparity map provided from module 1152.

In single-channel processing, the left-view output picture may be copied directly from the left-view input picture in a pass-through manner. The right-view output picture may be generated from the left-view input picture and the left view disparity map.

Figure 12:
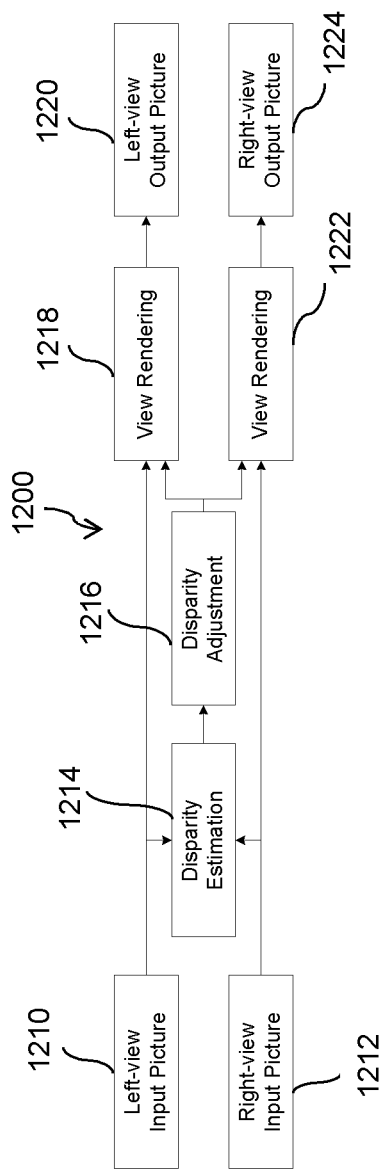
FIG. 12 is a block diagram of a system for implementing a dual channel rendering process.

Now referring to FIG. 12, a dual channel rendering process 1200 is described. The left view input picture 1210 and the right view input picture 1212 are provided to a disparity estimation module 1214. An estimated disparity map is provided to a disparity adjustment module 1216. The disparity adjustment module 1216 generates an adjusted disparity map based on the compression or expansion parameters and provides the left view adjusted disparity map to the left view rendering module 1218 and the right view adjusted disparity map to the right view rendering module 1222. The left view rendering module 1218 generates a left view output picture 1220 based on the adjusted disparity map from the disparity map adjustment module 1216 and the original left view input picture 1210. Similarly, the right view rendering module 1222 generates a right view output picture 1224 based on the adjusted disparity map from the disparity adjustment module 1216 and the right view input picture 1212.

Figure 13:
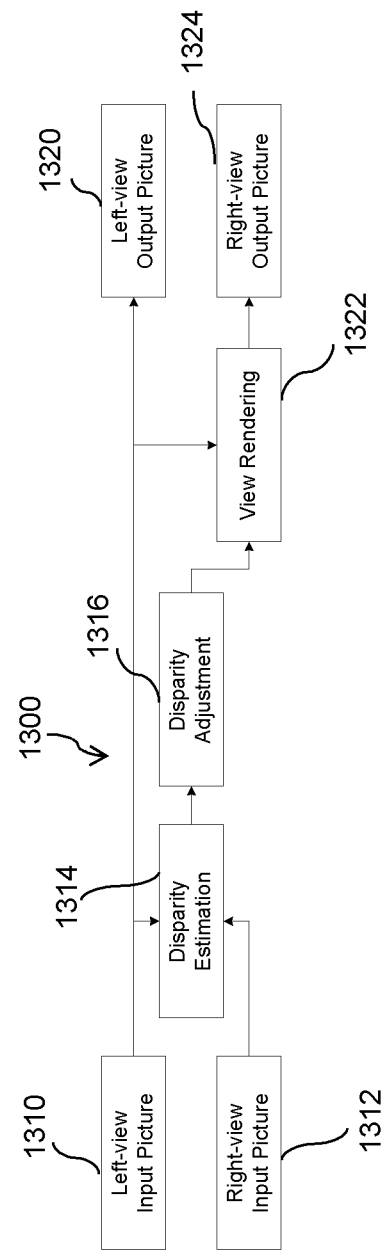
FIG. 13 is a block diagram of a system for implementing a single channel rendering process.

Now referring to FIG. 13, a single channel rendering process 1300 is described. The left view input picture 1310 and the right view input picture 1312 are provided to a disparity estimation module 1314. An estimated disparity map is provided to a disparity adjustment module 1316. The disparity adjustment module 1316 generates an adjusted disparity map based on the compression or expansion factors and provides the adjusted disparity map to the right view rendering module 1322. The left view input picture 1310 is used as the left view output picture 1320. The right view rendering module 1322 generates a right view output picture 1324 based on the adjusted disparity map from the disparity adjustment module 1316 and the left view input picture 1310.

The dual-channel rendering process creates true three-dimensional depth perception using both left-view and right-view input pictures that contain occluded pixels. The single-channel rendering process creates stereo output pictures without occluded pixels, thus at reduced depth perception.

When the rendered output picture moves further away in depth from the input picture at large depth compression or depth expansion rates, the errors in disparity maps are magnified and become easily noticeable to viewers as artifacts. At very high depth compression rates, it is possible to substitute the dual-channel rendering with single-channel rendering such that the stereo output pictures are created with a significantly smaller amount of visible artifacts.

Figure 14A:
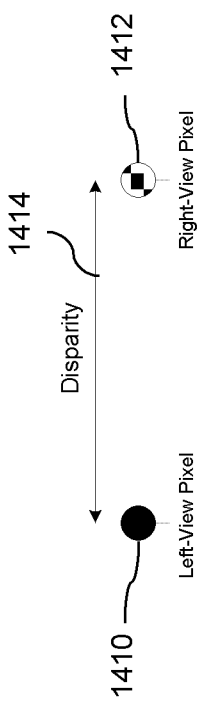
FIGS. 14A-14D are illustrations of various range compression methods.

Now referring to FIG. 14A, the original left view pixel position is denoted by reference number 1410 and the original right view pixel location is denoted by reference numeral 1412. Accordingly, the disparity or distance between the left view pixel location 1410 and the corresponding right view pixel location 1412 as denoted by arrow 1414.

Figure 14B:
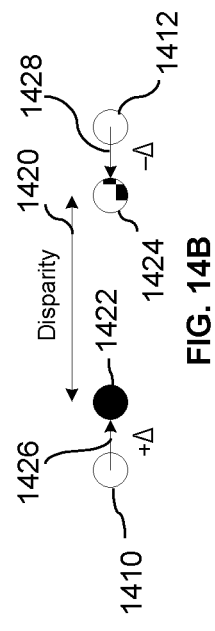

Now referring to FIG. 14B, a small depth range compression is provided using a dual channel method. The pixel position 1410 is shifted to pixel position 1422 as denoted by arrow 1426. Further, pixel location 1412 is shifted to right view pixel location 1424 as denoted by arrow 1428. As such, the disparity is reduced as denoted by arrow 1420. In this instance, the disparity 1420 is still relatively large and the magnitude of the shifts 1426 and 1428 are relatively small, therefore, only a small error is produced in the image.

Figure 14C:
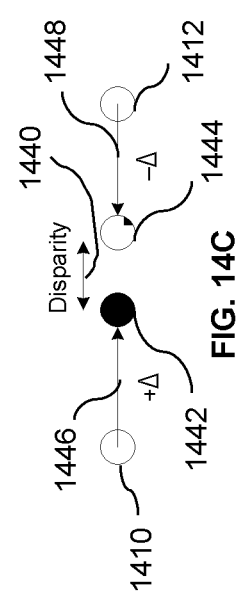

Now referring to FIG. 14C, a large depth range compression is provided using a dual channel method. As such, the left view pixel 1410 is shifted to the left view pixel location 1442, as denoted by arrow 1446. Further, the right view pixel location is shifted from location 1412 to location 1444, as denoted by arrow 1448. The resulting disparity is denoted by line 1440. For this large depth range compression, the magnitude of the shift is large while the disparity becomes small. As such, the error is large in comparison. In this scenario, various inconsistencies can develop in the image and may be recognized by the viewer.

Figure 14D:

Now referring to FIG. 4D, a single channel large depth range compression can be used in certain instances to avoid the problems with a large depth range compression in dual channel mode. In FIG. 14D, the left view image is utilized as a template for the right view image. Accordingly, the left view pixel position 1410 remains unchanged while the right view pixel position 1462 is determined according to a disparity shift 1464 relative to the left view pixel location 1410. Accordingly, the overall disparity between the left view pixel position 1410 and the right view pixel position 1462 is small as denoted by line 1460. Accordingly, a large depth range compression for a single channel may provide both a small disparity and a small magnitude change, therefore, resulting in a small error and improved visual quality.

Figure 15:
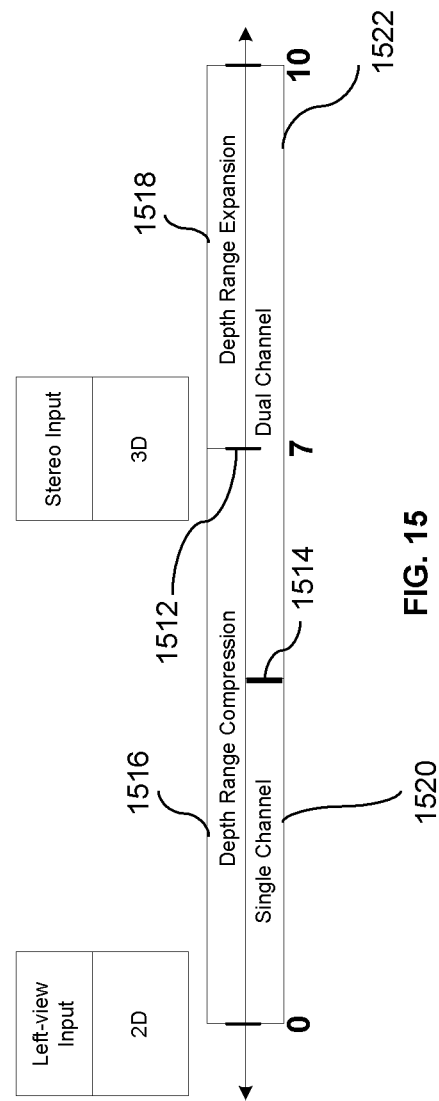
FIG. 15 is a graph illustrating an exemplary usage of both single and dual channel processes.

An example of applying single-channel and dual-channel rendering processes to depth control is shown in FIG. 15. For normal operations of depth compression and depth expansion, dual-channel rendering may be used. For very high depth compression rates, single-channel rendering process may be used.

A graph is provided illustrating the use of both the single and dual channel compression methods in the same system. Bar 1516 represents the range of depth range compression while bar 1518 illustrates the range of depth range expansion. As such, line 1512 represents the change from depth range compression to depth range expansion where for depth range expansion, a dual channel method is preferred as denoted by bar 1522 extending for the entire range of depth expansion 1518. Further, for low values of depth range compression, dual channel compression is preferred, as denoted by the portion of the bar 1522 extending past line 1512 into the depth range compression. However at a certain threshold point as denoted by line 1514, a single channel compression, as denoted by bar 1520, is preferred. Accordingly, the system may change from dual channel depth range compression to single channel depth range compression at a given compression threshold as determined by the magnitude of the shift and the overall disparity between the left view pixel and the right view pixel.

Figure 16:
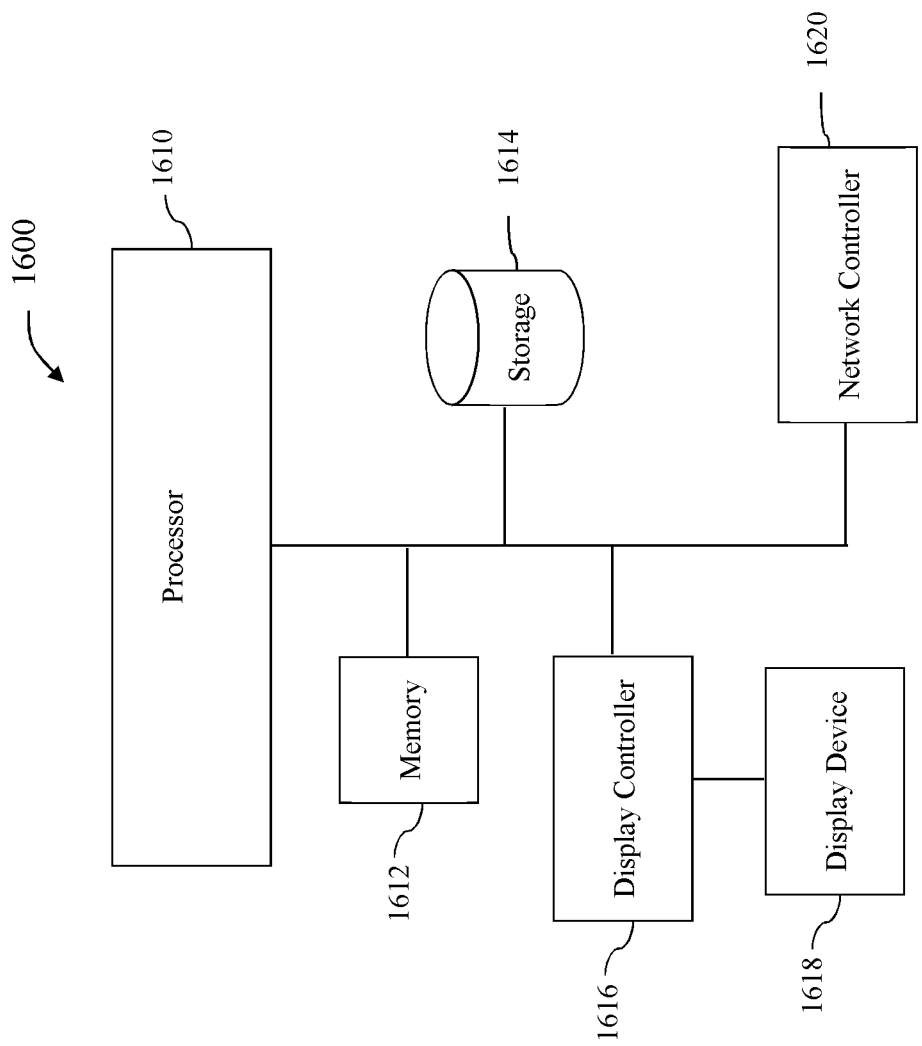
FIG. 16 is a block diagram for one example of a processor system capable of implementing the methods described herein.

Any of the modules, servers, or engines described may be implemented in one or more processors or processor systems. One exemplary system is provided in FIG. 16. The processor system 1600 includes a processor 1610 for executing instructions such as those described in the methods discussed above. The instructions may be stored in a computer readable medium such as memory 1612 or storage devices 1614, for example a disk drive, CD, or DVD. The processor system may include a display controller 1616 responsive to instructions to generate a textual or graphical display on a display device 1618, for example a computer monitor. In addition, the processor 1610 may communicate with a network controller 1620 to communicate data or instructions to other systems, for example other general computer systems. The network controller 1620 may communicate over Ethernet or other known protocols to distribute processing or provide remote access to information over a variety of network topologies, including local area networks, wide area networks, the Internet, or other commonly used network topologies.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

As a person skilled in the art will readily appreciate, the above description is meant as an illustration of the principles of this application. This description is not intended to limit the scope of this application in that the system is susceptible to modification, variation and change, without departing from spirit of this application, as defined in the following claims.

What is claimed is:

1. A system for generating a three dimensional image, the system comprising:
a processor configured to access a stereo image, wherein the processor is configured to generate a disparity map from the stereo image, adjust the disparity map to compress a number of depth values within the disparity map to generate an adjusted disparity map by shifting a plurality of disparity values of the disparity map towards a pivot of the disparity map by subtracting a compression value from a first set of the plurality of disparity values that are at a distance greater than or equal to the compression value and by shifting a second set of the plurality of disparity values to the pivot where the second set of the disparity values are at a distance less than the compression value, wherein the pivot is a viewing screen depth and the compression value is an amount of depth by which the first set of the plurality of disparity values are to be shifted, and render a stereo view of the image based on the adjusted disparity map.

2. The system according to claim 1, wherein the processor is configured to subtract the compression value from the disparity values in the disparity map, unless a disparity value is less than the compression value, wherein if the disparity value is less than the compression value then the disparity value is set to the pivot value.

3. The system according to claim 1, wherein the processor is configured to multiply disparity values of the disparity map by an expansion factor.

4. The system according to claim 1, wherein the processor is configured to shift disparity values of the disparity map away from the pivot of the disparity map by adding an expansion value.

5. The system according to claim 4, wherein the processor is configured to add the expansion value to the disparity values in the disparity map, unless a disparity value is less than the expansion value, wherein if the disparity value is less than the expansion value then a value less than the expansion value is added to the disparity value.

6. The system according to claim 1, wherein the processor is configured to generate a pixel to pixel correspondence between each pixel in a first view of the stereo image and neighboring pixels in a second view of the stereo image to generate a disparity map.

7. The system according to claim 6, wherein the processor is configured to identify patterns of disparity based on the pixel to pixel correspondence between each pixel in a first view of the stereo image and neighboring pixels in a second view of the stereo image.

8. The system according to claim 7, wherein the processor is configured to generate a one dimensional array for each pixel in the first view including a comparison of spatial features for each pixel relative to neighboring pixels in the second view of the stereo image.

9. The system according to claim 8, wherein the spatial features include at least one of luma, chroma, and edge transforms.

10. The system according to claim 8, wherein the processor is configured to generate a two dimensional array including the one dimensional array for each pixel in a row of the first view.

11. The system according to claim 10, wherein the processor is configured to identify a series of similarity values in the two dimensional array to determine a disparity value for a reference pixel.

12. The system according to claim 1, wherein the processor is configured to generate a depth map based on monocular cues from a left view and right view of the stereo image and generating a smooth synthetic depth surface from the depth map.

13. The system according to claim 12, wherein the processor is configured to generate a combined disparity map based on a combination of the synthetic depth surface and the disparity map.

14. The system according to claim 1, wherein the processor is configured to apply a plurality of relationships for depth adjustment, where each relationship is applied to each pixel based on an estimated disparity value for each pixel.

15. The system according to claim 1, wherein the processor is configured to receive a first input view and a second input view, the disparity is estimated based on the first and second input view, the processor is configured to render a first output view and a second output view based on the image for first input view and not the image for the second input view.

16. The system according to claim 1, wherein the processor is configured to compare the compression value to a compression threshold and apply a dual channel depth adjustment if the compression value is above the compression threshold and a single channel compression if the compression value is below the compression threshold.

17. The system according to claim 1, wherein the processor is configured to shift disparity values that are at a depth behind the pivot toward the pivot by the compression value and symmetrically shift disparity values that are at a depth in front of the pivot toward the pivot also by the compression value.

18. A method for generating a three dimensional image, the method comprising the steps of:
   accessing a stereo image;
   generating a disparity map from the stereo image;
   adjusting the disparity map to expand a number of depth values within the disparity map to generate an adjusted disparity map;
   generating the adjusted disparity map based on shifting a group of pixels away from a pivot point by adding an expansion value to a first set of disparity values of the group of pixels that are at a distance greater than or equal to the expansion value and by shifting a second set of disparity values of the group of pixels by a value less than the expansion value where the second set of the disparity values are at a distance less than the expansion value, wherein the pivot is a viewing screen depth and the expansion value is an amount of depth by which the group of pixels are to be shifted away from the pivot; and
   rendering a stereo view of the image based on the adjusted disparity map.

19. The method according to claim 18, further comprising adding the expansion value to disparity values in the disparity map, unless a disparity value is less than the expansion value, wherein if the disparity value is less than the expansion value then a value less than the expansion value is added to the disparity value.

20. A system for generating a three dimensional image, the system comprising:
   a processor configured to access a stereo image, wherein the processor is configured to generate a disparity map from the stereo image, adjust the disparity map to expand a number of depth values within the disparity map by shifting a depth of a group of pixels away from a viewing screen depth to generate an adjusted disparity map, and render a stereo view of the image based on the adjusted disparity map; and
   wherein the processor is configured to generate the adjusted disparity map based on shifting a group of pixels away from a pivot point by adding an expansion value to a first set of disparity values of the group of pixels that are at a distance greater than or equal to the expansion value and by shifting a second set of disparity values of the group of pixels by a value less than the expansion value where the second set of the disparity values are at a distance less than the expansion value, wherein the pivot is a viewing screen depth and the expansion value is an amount of depth by which the group of pixels are to be shifted away from the pivot.

* * * * *